(12) United States Patent
Vallart et al.

(10) Patent No.: US 9,193,453 B2
(45) Date of Patent: Nov. 24, 2015

(54) METHOD OF DRIVING ROTATION OF A ROTORCRAFT ROTOR BY ANTICIPATING TORQUE NEEDS BETWEEN TWO ROTARY SPEED SETPOINTS OF THE ROTOR

(71) Applicant: AIRBUS HELICOPTERS, Marignane (FR)

(72) Inventors: Jean-Baptiste Vallart, Marseille (FR); Hilario Vieira, Berre l'etang (FR)

(73) Assignee: Airbus Helicopters, Marignane (FR)

( * ) Notice: Subject to any disclaimer, the term of this patent is extended or adjusted under 35 U.S.C. 154(b) by 186 days.

(21) Appl. No.: 14/140,647

(22) Filed: Dec. 26, 2013

(65) Prior Publication Data

US 2014/0229036 A1    Aug. 14, 2014

(30) Foreign Application Priority Data

Dec. 27, 2012  (FR) ...................... 12 03608

(51) Int. Cl.
| | | |
|---|---|---|
| *B64C 19/00* | (2006.01) | |
| *B64C 27/32* | (2006.01) | |
| *B64C 27/57* | (2006.01) | |
| *B64C 27/12* | (2006.01) | |
| *B64D 31/00* | (2006.01) | |
| *B64D 31/06* | (2006.01) | |

(Continued)

(52) U.S. Cl.
CPC ............... *B64C 27/57* (2013.01); *B64C 27/04* (2013.01); *B64C 27/12* (2013.01); *B64D 31/00* (2013.01); *B64D 31/06* (2013.01); *F02C 9/00* (2013.01); *F05D 2220/329* (2013.01); *F05D 2270/335* (2013.01); *F05D 2270/44* (2013.01); *Y02T 50/671* (2013.01)

(58) Field of Classification Search
None
See application file for complete search history.

(56) References Cited

U.S. PATENT DOCUMENTS

| | | | |
|---|---|---|---|
| 3,174,284 A | 3/1965 | McCarthy | |
| 4,466,526 A | 8/1984 | Howlett et al. | |
| 5,314,147 A | 5/1994 | Ebert et al. | |

(Continued)

FOREIGN PATENT DOCUMENTS

| | | |
|---|---|---|
| CN | 101495368 A | 7/2009 |
| CN | 101905742 A | 12/2010 |

(Continued)

OTHER PUBLICATIONS

Search Report for FR 1203608, Completed by the French Patent Office on Aug. 27, 2013, 6 pages.

(Continued)

*Primary Examiner* — Mussa A Shaawat
(74) *Attorney, Agent, or Firm* — Brooks Kushman P.C.

(57) ABSTRACT

A method of driving a rotorcraft rotor (1, 2) at variable controlled speeds. Starting from a required speed (Nr), a setpoint for total power (Pt) is calculated while taking account of an anticipated power (Pf) to be delivered by the power plant (3) for driving the main rotor (1) at the required speed (Nr), and while taking account of a power surplus (S) relating to progressive power needs to be delivered from a current power (Pc) for driving the main rotor (1) at a current speed (V) of rotation to an anticipated power (Pf) for driving the main rotor (1) at the required speed (Nr). By way of example, account may be taken at least of the acceleration or conversely of the deceleration of the main rotor (1) between the current speed (V) and the required speed (Nr), or indeed account may be taken of the flight circumstance of the rotorcraft determining the calculated required speed (Nr).

20 Claims, 1 Drawing Sheet

(51) Int. Cl.
*F02C 9/00* (2006.01)
*B64C 27/04* (2006.01)

(56) References Cited

U.S. PATENT DOCUMENTS

| | | | |
|---|---|---|---|
| 5,465,212 A | 11/1995 | Fowler et al. | |
| 5,799,901 A * | 9/1998 | Osder | 244/17.13 |
| 5,951,608 A * | 9/1999 | Osder | 701/11 |
| 6,198,991 B1 | 3/2001 | Yamakawa et al. | |
| 6,885,917 B2 * | 4/2005 | Osder et al. | 701/3 |
| 7,988,089 B2 * | 8/2011 | Wittmer | 244/17.13 |
| 2007/0118254 A1 | 5/2007 | Barnes et al. | |
| 2008/0283671 A1 | 11/2008 | Cherepinsky et al. | |
| 2010/0312421 A1 | 12/2010 | Eglin | |
| 2012/0253560 A1 | 10/2012 | Corpron et al. | |

FOREIGN PATENT DOCUMENTS

| | | |
|---|---|---|
| CN | 102730190 A | 10/2012 |
| EP | 0398840 B1 | 10/1996 |
| FR | 2550161 | 2/1985 |
| GB | 2144244 A | 2/1985 |
| WO | 2009030532 A1 | 3/2009 |

OTHER PUBLICATIONS

Schaefer et al. 47th Forum American Helicopter Society 1991, p. 1293-1303, "Enhanced energy maneuverability for attack helicopters using continuous variable (C-V) rotor speed control".

Chinese First Office Action Dated Jun. 24, 2015, Application No. 201310757422.9, Applicant Airbus Helicopters, 5 pages.

* cited by examiner

METHOD OF DRIVING ROTATION OF A ROTORCRAFT ROTOR BY ANTICIPATING TORQUE NEEDS BETWEEN TWO ROTARY SPEED SETPOINTS OF THE ROTOR

CROSS REFERENCE TO RELATED APPLICATION

This application claims priority to French patent application No. FR 12 03608 filed on Dec. 27, 2012, the disclosure of which is incorporated in its entirety by reference herein.

BACKGROUND OF THE INVENTION (1) Field of the Invention

The present invention relates to the field of rotorcraft having at least one rotary wing rotor. The present invention relates more particularly to data processing methods adapted to a specific function of determining a setpoint for transmission to a regulator unit for regulating the operation of a power plant of the rotorcraft to ensure that it drives said at least one rotor at a given speed of rotation.

Still with reference to the field of the present invention, the function of determining said setpoint takes account more specifically of anticipating power needs that must be delivered by the power plant in order to drive said at least one rotor at a given speed of rotation.

(2) Description of Related Art

In the field of aviation, rotorcraft are rotary wing aircraft provided with at least one rotor. Such a rotor is specifically at least one main rotor having an axis that is substantially vertical and providing the rotorcraft at least with lift. In the context of a helicopter, the main rotor provides the rotorcraft not only with lift, but also with propulsion and/or flight guidance in pitching and in roll.

Rotorcraft are also fitted with an anti-torque device. By way of example, such an anti-torque device is an air propulsion device, and is more commonly in the form of at least one auxiliary rotor having a substantially horizontal axis and providing the rotorcraft with guidance in yaw. By way of example, such an auxiliary rotor is a tail rotor or a propulsive propeller for a high speed rotorcraft with long range.

The lift of the rotorcraft is provided by the main rotor. It is traditional to vary the lift of the rotorcraft by means of a control for varying the collective pitch of the blades making up the rotary wing of the main rotor. Driving rotation of the main rotor is considered as being a priority, given the essential lift-providing function of the rotorcraft.

With a helicopter, the rotorcraft is guided in pitching and in roll by cyclic pitch variation of the blades of the main rotor. The rotorcraft is conventionally guided in yaw by using the anti-torque device, e.g. by varying the collective pitch of the auxiliary rotor(s) of substantially horizontal axis. A rotorcraft may also be guided in full or in part by means of tiltable flaps or other analogous movable control surfaces fitted to a fixed wing of the rotorcraft, such as one or more elevators, and/or one or more fin flaps.

The rotor(s) of a rotorcraft is/are conventionally driven by a common power plant having one or more engine members. The power plant is also used for driving various members and/or pieces of equipment of the rotorcraft that consume mechanical energy.

By way of example, such members and/or pieces of equipment comprise an electrical machine for electrically powering an electricity network on board the rotorcraft, or indeed a reversible electrical machine that is capable, selectively, of delivering mechanical power for driving the rotor(s). Also by way of example, such members and/or pieces of equipment comprise one or more pieces of ancillary equipment, such as for example a heating, ventilation, and/or air conditioning system.

The engine member(s) of the power plant is/are commonly arranged as a turboshaft engine having a free turbine driven in rotation by a gas generator. The free turbine delivers rotary drive to the rotor(s), conventionally via at least one main gearbox interposed between the free turbine and the rotor(s).

Said members and/or pieces of equipment of the rotorcraft that consume mechanical power are also commonly driven from the main gearbox.

The power plant is dimensioned as a function of a predefined nominal speed of rotation for said at least one main rotor. Historically, the speed at which a main rotor is driven in rotation has for many years been established as a constant, or as being marginally variable over a narrow range of speeds. Historically speaking, the lift provided by the main rotor is adjusted solely by a control for varying the collective pitch of the blades. Any other rotors of the rotorcraft, or indeed said members or instruments of the rotorcraft that consume mechanical power, are driven depending on the power available as delivered by the power plant.

The flight commands as issued by the pilot of the rotorcraft are mutually coupled, in order to ensure that the desired variation in the flight of the rotorcraft matches the power being delivered by the power plant as shared between the various rotors, depending on needs. The various commands for varying the pitch of the blades of the various rotors are generated by a pilot of the rotorcraft using flight controls, such as a human pilot using manual control members or an autopilot acting via calculation means.

The power plant is generally fitted with a unit for regulating its operation (e.g. such as a full authority digital engine control (FADEC)). The regulator unit has a setpoint relating to the power needs that the power plant must deliver for driving the main rotor at said nominal speed. This setpoint is delivered by a control unit of the rotorcraft (e.g. such as an automatic flight control system (AFCS)).

More particularly, the control unit generates information relating to a request for power to be delivered by the power plant in order to satisfy the overall power needs of the rotorcraft. In compliance with the priority power needs of the main rotor, the control unit generates a setpoint relating to the power needs of the main rotor driven at a given speed of rotation, and depending on a previously-identified flight state of the rotorcraft. Such a setpoint is calculated by the control unit depending on said given rotary drive speed for the main rotor for a given flight state of the rotorcraft.

Said setpoint is transmitted by the control unit to the regulator unit in order to cause the operation of the power plant to be regulated as a function of the immediate torque needs of the main rotor, and consequently as a function of the immediate torque needs of any other rotors of the rotorcraft, or indeed as a function of power needs of ancillary equipment of the rotorcraft that consumes mechanical energy.

For this purpose, the setpoint is determined in particular by making use of flight controls operated by the pilot, with the power that needs to be delivered by the power plant being deduced from those flight controls. The regulator unit incorporated in the power plant processes the setpoint issued by the control unit in order to determine the quantity of fuel needed by the power plant in order to satisfy the need for driving the main rotor at its nominal speed, given the power needs identified by the setpoint.

On this topic, reference may be made for example to Document U.S. Pat. No. 3,174,284 (United Aircraft Corp.), which describes modes of operating such a regulator unit.

Alternatively, as disclosed by Document U.S. Pat. No. 5,314,147 (United Technologies Corp.), the setpoint is processed by the regulator unit not only depending on the load applied to the rotor(s) as defined by the flight commands issued by the pilot, but also while taking account of a particular flight situation of the rotorcraft, such as a combat situation in which a weapon of the rotorcraft is activated.

Still concerning a particular situation from which the regulator unit defines the quantity of fuel needed by the power plant, reference may be made to Document U.S. Pat. No. 4,466,526 (Chandler Evans Inc.), which describes modes for injecting fuel as a function of the main rotor being put into autorotation.

Regardless of the power that the regulator units may possess, it is nevertheless observed that discrepancies occur between the value of the setpoint issued by the control unit and the speed at which the main rotor is actually driven in rotation. Such discrepancies may result from the structure of the rotorcraft, e.g. because of inertia in the free turbine slowing down its response to being driven by the gas generator, or because of the inertia of the drivetrains for operating the blades or the rotors.

Such inertias have led designers to develop means for enabling the control unit to anticipate the power needs to be delivered by the power plant for driving the rotor(s) at the setpoint speed. The operation of the power plant itself is then governed by the regulator unit on the basis of the setpoint that is transmitted thereto by the control unit in order to obtain actual rotary drive of the main rotor at the setpoint speed while taking account of the flight commands previously issued by the pilot of the rotorcraft.

For example, in the context of electric flight controls, Document US 2008/0283671 (Sikorsky Aircraft Corp.) proposes making use of the signals issued by a pilot in order to generate a power setpoint. More particularly, depending on the flight commands issued by the pilot, the control unit uses anticipation in order to deduce a power setpoint for the power that the power plant is to deliver, and transmits this anticipated power setpoint to the regulator unit. Advantage is taken of the response time of the rotorcraft between issuing flight commands and actual variation in the pitch of the blades of the main rotor in order to generate said power setpoint in anticipation.

Furthermore, changing technology has led rotorcraft designers to envisage modifying the speed of rotation of the main rotor by using a control order that depends on a variation in the values of various parameters.

In particular, it is known voluntarily to cause the value of said setpoint as generated by the control unit to vary over an acceptable range of speeds given that flight conditions of the aircraft must be kept safe. By way of example, variation in the value of the setpoint may be controlled as a function of variation in the flying or "air" speed of the rotorcraft in order to improve its performance. On this topic, reference may be made to the publication "Enhanced energy maneuverability for attack helicopters using continuous variable rotor speed control" (C. G. Schaefer Jr., F. H. Lutze Jr.); 47th Forum American Helicopter Society 1991, pp. 1293-1303.

Proposals have also been made to vary the rotary drive speeds of the main rotor depending on two predefined limiting speeds for an acceptable range of speeds of rotation for the main rotor, providing that flight of the rotorcraft is kept safe.

For example, according to document US 2007/118254 (G. W. Barnes et al.), proposals are made to vary the speed of rotation of the rotor selectively depending on a maximum speed or a minimum speed as a function of the values of parameters relating to the ambient outside medium in which a rotorcraft is operating. By way of example, such parameters are identified from the height of the rotorcraft above the ground, its pressure altitude, its density altitude, or outside temperature.

Also by way of example, document U.S. Pat. No. 6,198,991 (Yamakawa et al.) proposes modifying the speed of rotation of the main rotor when the rotorcraft is in an approach stage coming up to a landing zone, by adapting the path followed by the rotorcraft in order to reduce the sound nuisance it generates.

Nevertheless, it has been found that known rules for anticipating power needs of the power plant are insufficient for such modes of controlled variation in the rotary drive speed of the main rotor.

BRIEF SUMMARY OF THE INVENTION

In this context, an object of the present invention is to provide a method of delivering rotary drive to at least one rotorcraft rotor, in particular a main rotor and/or an ancillary rotor, that makes use of a method of determining the power to be delivered by the power plant in anticipation.

It is desired to obtain such power anticipation that is capable of being made pertinent and reliable in the particular context of driving the main rotor at controlled variable speeds of rotation depending on variation in the value of at least one predefined parameter. Such drive of the main rotor at variable speeds is caused to take place spontaneously by calculation means of the rotorcraft, in particular its control unit, and this may potentially be done in continuous manner or in steps of predefined values.

It should be considered that in the application of the present invention, it is more particularly desirable to obtain said power anticipation in the context of:

controlled variation in the rotary drive speed of the main rotor in compliance with a potentially large range of speeds, such as for example a range extending from about 90% to about 110% of a reference speed;

orders for varying the drive speed of the main rotor that may potentially be generated at a sustained rate, while also taking account in isolation or in combination of various criteria that generate such variation orders and that may potentially be numerous; and executing a variation in the drive speed of the main rotor over durations that may differ depending on various said speed variation orders.

The method of the present invention is a method of driving rotation of at least one rotorcraft rotor by a power plant of the rotorcraft.

The method of the present invention comprises an operation performed by a control unit identifying a required speed for driving rotation of at least one vertical-axis main rotor of the rotorcraft. The required speed is calculated by applying a first calculation rule incorporating at least a first calculation parameter giving rise to controlled variation, within a predefined range of values, in the value of the required speed depending on variation in the value of the first calculation parameter.

In this context, the required speed is determined by the first calculation rule for controlled variation of the drive speed of the main rotor. Executing the first calculation rule generates the required speed value, thus enabling it to be identified.

In the provisions put forward by the present invention, it should be considered that the controlled variation of the required speed potentially results from a flight control operated by a pilot, which may equally well be an autopilot or a human pilot, and/or may also potentially be the result of a spontaneous variation caused by a variation in the value of the first calculation parameter on the basis of information about the flight state or flight situations of the rotorcraft.

Alternatively, it should be considered that the control unit preferably generates a required speed setpoint that is transmitted at least to servo-control means for servo-controlling the drive of the main rotor to the required speed, such servo-control means potentially being incorporated at least in part in regulator means for regulating the operation of the power plant.

By way of example, said servo-control means comprise a servo-control calculator dedicated specifically to regulating the drive of the main rotor at the required speed. The regulation of the drive of the main rotor is potentially performed by regulating the operation of engine means of the rotorcraft for the purpose of driving at least the main rotor in rotation, and/or by using mechanical transmission means interposed in a drivetrain for the main rotor. Said engine means may in particular be constituted by a power plant that includes a fuel-burning engine, in particular a turboshaft engine, and potentially also including an electrical machine engaged with the drivetrain for driving the main rotor. In particular with a hybrid power plant for a rotorcraft combining a fuel-burning engine and a reversible electrical machine, such an electrical machine advantageously provides an extra margin of mechanical power in the short-term in order to satisfy previously-identified specific needs.

Still in the context of provisions put forward by the present invention, it should also be considered that said controlled variation leads to a variation in the required speed that may equally well take place in steps of predefined value or by progressive and continuous variation in the required speed, depending on the variation in the value of the first calculation parameter.

Still in the context of the provisions put forward by the present invention, and by way of example, it should also be considered that the first calculation parameter is a physico-chemical parameter characteristic of the ambient air outside the helicopter, in particular its density or its temperature. Also by way of example, the first calculation parameter may relate to a change in the flight state of the rotorcraft, such as a variation in its flying speed and/or a variation in its position along the gravity axis, which may equally well be expressed in terms of height above the ground or altitude. Also by way of example, the first calculation parameter relates to a specific flight situation of the rotorcraft, such as overflying a particular territory, a stage of approaching or departing from a landing zone, or indeed taking up a combat situation, for example. Also by way of example, the first calculation parameter may relate to the travel speed of a blade of the main rotor, and more particularly the travel speed of at least one advancing blade of the main rotor, this speed being taken into consideration at the free end of the blade and being expressed relative to the local speed of sound.

The method of the present invention also includes an operation of the control unit that applies a method of calculating a power setpoint to be delivered by the power plant. The calculation of said power setpoint is based in particular at least on applying a second calculation rule incorporating at least one second calculation parameter for calculating anticipated power that the power plant must deliver as a function at least of loads supported by the main rotor driven at the previously-identified required speed.

The method of the present invention also includes an operation of transmitting at least one control order relating at least to said power setpoint to regulator means for regulating the operation of the power plant. Said regulator means cause the power plant to be operated to drive said at least one rotor in rotation in compliance with driving the main rotor in rotation at the required speed according to the power setpoint generated by the control unit. The regulator means comprise at least one regulator unit for regulating injection of fuel to at least one fuel-burning engine of the power plant, or indeed control means for operating an electrical machine in the context of the rotorcraft having a hybrid power plant.

According to the present invention, such a method is mainly recognizable in that the second calculation rule for calculating said power setpoint incorporates at least one third calculation parameter concerning a power surplus. Said power surplus relates to progressive power needs to be delivered from a current power for driving the main rotor at a current speed of rotation to an anticipated power for driving the main rotor at the required speed.

The anticipation of the power needs to be delivered by the power plant takes account not only of said anticipated power, but also of the power surplus needed for progressively driving the rotor(s) from the current speed to the required speed.

Such anticipation of progressive power needs, and transmitting a command order to the regulator unit that incorporates not only the anticipated power but also said power surplus on the basis of such progressive power needs, makes it possible to shorten the reaction time between issuing the control order and the rotor(s) of the rotorcraft actually being driven in compliance with the required drive speed for the main rotor.

The rotorcraft presents improved and reliable ability to react in compliance with the flight commands issued by the pilot and/or a variation in the value of one or more of any of said first parameters determining the required speed. Such a reaction capacity of the rotorcraft is obtained even in the context of orders for varying the rotary drive speed of the main rotor potentially occurring at a sustained rate and over a speed variation range that is potentially large, and regardless of the time needed for executing any such controlled speed variation.

In particular, the provisions of the present invention make it possible in reliable and satisfactory manner to mitigate the inertia of structural members of the rotorcraft contributing to operating its rotor(s). Such structural members participating in operating the rotor(s) comprise essentially:

transmission members of the rotorcraft making up the drivetrains between the rotor(s) and the power plant. More specifically, these transmission members are those interposed between the rotor(s) and the free turbine of at least one turboshaft engine of the power plant, or indeed they include such a free turbine because of its own inertia in terms of responding to drive from a gas generator forming part of the power plant; and members of the rotorcraft making up the control drivetrains between the pilot and the blades or the rotors. Such control drivetrains are used in particular to cause the pitch of the blades of the rotor(s) to vary collectively and/or cyclically.

Application of the present invention is particularly, but not exclusively, adapted to calculating the speed required depending on the desired continuous progressive variation in the rotary drive speed of the main rotor. The present invention is also applicable to the context of the required speed being varied by predetermined steps.

It should be considered that the first calculation rule and the second calculation rule may advantageously be incorporated in a single calculation module forming part of the main calculation means dedicated to identifying the required speed, with it being equally possible for the first calculation rule and the second calculation rule to be used in association or to be incorporated one within the other.

An advantage of the present invention is the possibility of taking account of said power surplus regardless of the way the required speed is identified and regardless of the time period for drive of the main rotor to change from the current speed to the required speed.

Taking account of the dynamic variation in the power to be delivered by the power plant between the current speed and the required drive speed for the main rotor also makes it possible to incorporate various calculation criteria in the third parameter.

A first calculation criterion is a main criterion taking account in particular of transient stages of acceleration and/or deceleration of the main rotor. More particularly, the third calculation parameter advantageously incorporates a first calculation criterion relating to the acceleration or conversely to the deceleration of the main rotor between the current speed and the required speed.

In this context, account is taken in particular of transient stages in the drive of the main rotor at different speeds of rotation depending on respective flight states or flight situations for which there are specific required speeds. Such transient stages may be of varying durations, with the consequence of generating their own specific acceleration or deceleration stages. Such own specific acceleration or deceleration stages are taken into account in order to anticipate the instantaneous power needs of the rotorcraft.

Consideration may potentially be given to variants taking account of a said first calculation criterion relating to progressive variation in the speed of rotation of the main rotor. The first calculation criterion comprises any of at least the following calculation criteria:

a time period between driving the main rotor at the current speed and at the required speed;

a progressive variation in the number of revolutions of the main rotor between the number of revolutions of the main rotor driven at said current speed and the number of revolutions of the main rotor driven at said required speed;

the instantaneous time derivative of the anticipated power; and any of at least first calculation parameters from which the required speed is defined.

Said power surplus is potentially identifiable depending on various factors that can influence the dynamic variation in the power to be delivered by the power plant between the current speed and the required drive speed for the main rotor.

In this context, said secondary criteria may be taken into account while executing the second calculation rule in order to generate the control order for transmission to the regulator unit in application of the third calculation parameter. Such secondary criteria are advantageously incorporated in the second calculation rule, and more particularly they are preferably incorporated in the third calculation parameter so as to enable said secondary criteria to be taken into account not only for determining at least said anticipated power, but also for calculating said power surplus.

For example, the third calculation parameter may have incorporated therein a second calculation parameter relating to modes of using auxiliary members on board the aircraft that consume mechanical power over a time period between driving the main rotor at the current speed and at the required speed.

The progressive power needs taken into account for anticipating the power needs of the rotorcraft to be delivered by the power plant may extend over a time period that is potentially long. Such a time period should be taken into consideration in comparison with the duration that elapses between the main rotor being driven at said current speed, considered as being an initial speed at a given instant, and the main rotor being driven at the required speed. The initial current speed and the required drive speed for the main rotor may potentially be used for respective flight situations of the rotorcraft, which flight situations are potentially spaced far apart in time.

The use made of respective ones of the various mechanical power consuming members of the rotorcraft may vary over said time period. It is proposed that the state of operation of those various mechanical power consuming members should be taken into account in order to anticipate the instantaneous power needs of the rotorcraft progressively as said time period elapses while passing from driving the rotor(s) at the initial current speed to achieving the required drive speed for the main rotor.

The conventional manner in which a variation in the collective pitch of an auxiliary rotor or the forces delivered by any analogous anti-torque device is taken into account is preferably associated with taking account over said time period of variation in the uses made of respective ones of the mechanical energy consuming members of the rotorcraft.

More particularly, it should be considered that the second calculation criterion may for example be a calculation criterion potentially comprising any of at least the following calculation criteria:

varying forces developed by an anti-torque device of the aircraft, such as a variation in the collective pitch of the blades of an anti-torque rotor of the rotorcraft or a variation in the way in which any anti-torque device is used, such as air propulsion;

varying the cyclic pitch of the blades of the main rotor;

controlling the operation of at least one movable control of the rotorcraft suitable for modifying its flight behavior;

controlling the operation of at least one piece of ancillary equipment of the rotorcraft, such as a heating, ventilation, and/or air conditioning system; and controlling the operation of an electrical machine of the rotorcraft, such as an alternator or a reversible electrical machine suitable for selectively delivering mechanical power for driving the rotor(s) of the rotorcraft.

The instantaneous power needs of the aircraft as said time period elapses while passing from driving the main rotor at an initial current speed and at the required speed may potentially vary depending on the instantaneous flight situation of the rotorcraft.

Consequently, it is preferable to take account of a change in the flight situation of the rotorcraft, in particular concerning a variation in the environment outside the rotorcraft and/or a change in a specific flight stage of the rotorcraft. For example, account may be taken of the flying speed of the rotorcraft, such as low speeds, transitory speeds, or cruising speed, and/or as another example, the position of the rotorcraft relative of the ground.

More particularly, and in the context of taking account of said secondary calculation criteria associated with the first calculation criterion, it is also proposed by way of example to incorporate in the third calculation parameter a third calculation criterion relating to a flight situation of the rotorcraft. This third calculation criterion comprises in particular any of at least the following calculation criteria:

progressive variation in the distance along the gravity axis between the rotorcraft and a terrestrial frame of reference, such as a variation in the altitude of the rotorcraft or its height above the ground;

variation in the aerodynamic characteristics of the rotorcraft. More particularly, such a variation in the aerodynamic characteristics of the rotorcraft is potentially taken into account during the period of time between driving the main rotor at the current speed and at the required speed. Such a modification in the aerodynamic characteristics of the rotorcraft is potentially caused by deploying or conversely by retracting, or indeed operating, a member that has the potential for generating drag, such as retractable landing gear or a retractable spotlight; and progressive variation in any of at least physicochemical parameters of the ambient air outside the rotorcraft, such parameters, such as density and temperature, having an influence on the lift obtained by the main rotor for a given blade pitch.

In a detailed example of the method of the present invention, said method more particularly comprises the following steps:

evaluating the current power delivered by the power plant;

collecting the required speed as generated by main calculation means incorporating the first calculation rule;

deducing the anticipated power corresponding to the power needed for driving the main rotor at the required speed by executing the second calculation rule in application of the second calculation parameter;

deducing the total power to be delivered depending on the previously deduced anticipated power and depending on said power surplus calculated by executing the second calculation rule in application of the third calculation parameter; and transmitting to the regulator unit a control order relating at least to the previously-deduced total power to be delivered.

In another detailed example of the method of the present invention, said method more particularly comprises the following steps in the context of the rotorcraft having a hybrid power plant:

evaluating the current power delivered by the power plant;

collecting the required speed as generated by main calculation means incorporating the first calculation rule;

deducing the anticipated power corresponding to the power needed for driving the main rotor at the required speed by executing the second calculation rule in application of the second calculation parameter;

calculating said power surplus by executing the second calculation rule in application of the third calculation parameter; and transmitting a first calculation order relating at least to said anticipated power to the regulator unit, and transmitting a second control order relating at least to said power surplus to control means for operating an electrical machine of the power plant, which machine is engaged in a drivetrain for driving the main rotor.

Preferably, the step of evaluating the current power delivered by the power plant comprises equally well in isolation or in combination:

an operation of collecting known information relating to said current power as previously calculated by implementing said method; and an operation of measuring in real time, in particular for a given blade pitch of the main rotor, the number of revolutions performed by the main rotor at a given instant.

Also preferably, the step of deducing the anticipated power comprises an operation of calculating the load to which the main rotor driven at the required speed will be subjected, and an operation of calculating said anticipated power on the basis of said calculated load.

By way of example, the step of calculating the power surplus comprises an operation of calculating the derivative of the difference between the revolutions of the main rotor driven respectively at the current speed and at the required speed over a given time period.

It should be considered that the second calculation rule may be executed equally well by sequences at a given frequency, preferably as short as possible, or continuously depending on continuous variation in the value of the third calculation parameter.

It should also be considered that the required speed can be determined by the first calculation rule equally well by detecting a value threshold reached by at least one said first calculation parameter for the required speed, or by detecting a continuous progressive variation in the value of at least one said first calculation parameter.

BRIEF DESCRIPTION OF THE SEVERAL VIEWS OF THE DRAWINGS

Implementations of the present invention are described with reference to the figures of the accompanying sheet, in which.

DETAILED DESCRIPTION OF THE INVENTION

Figure 1:
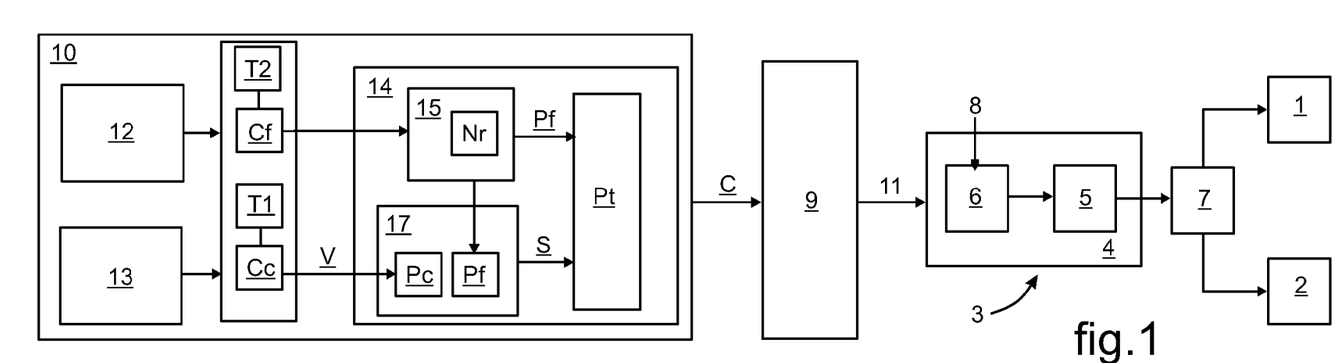
FIG. 1 is a block diagram showing a method in accordance with the present invention for driving one or more rotors of a rotorcraft at a controlled speed of rotation.

In FIG. 1, a rotorcraft has one or more rotors 1, 2 driven in rotation by a power plant 3. More particularly, the rotorcraft has at least one main rotor 1 with a substantially vertical axis providing the rotorcraft with lift, and possibly at least one auxiliary rotor 2 with an axis that is substantially horizontal.

The power plant 3 comprises at least one fuel-burning engine 4, a turboshaft engine in particular, having a free turbine 5 that is driven in rotation by a gas generator 6. The rotor(s) 1, 2 is/are driven in rotation by the free turbine 5, via a main gearbox 7 engaged with the free turbine 5. The gas generator 6 is fitted with fuel injector means 8 used under the control of a regulator unit 9 for driving the free turbine 5 at a speed of rotation as determined by the regulator unit 9 in accordance with a control order C transmitted by a control unit 10.

More particularly, the control unit 10 generates the control order C, which is transmitted to the regulator unit 9. The regulator unit 9, e.g. of the full authority digital engine control (FADEC) type, generates injection orders 11 for regulating in particular the rate at which fuel is admitted in the gas generator 6 via an injector an analogous manner for delivering fuel. In particular, the control unit 10 comprises two control modules 12, 13 such as respectively a module of the automatic flight control system (AFCS) type and a module of the primary flight control system (PFCS) type.

The control order C relates to at least a total level of power Pt to be delivered by the power plant 3 for driving the rotor(s) 1, 2 in accordance with driving rotation of the main rotor 1 at a required speed Nr. The required speed Nr is a controlled speed as previously calculated depending on a predefined flight circumstance or flight situation of the rotorcraft.

In the implementation shown, the required speed Nr is preferably calculated by the control unit 10. Nevertheless, it should be considered that it is possible for the required speed Nr to be calculated by a specific calculation unit associated with the control unit 10 that generates the value for the power Pt to be delivered.

The required speed Nr varies over a predefined range of speeds for driving the main rotor 1 in rotation. As an indication, such variation may lie in a range of speeds of about 90% to 110% of a nominal speed for driving rotation of the main rotor 1.

The control modules 12, 13 serve to estimate a flight circumstance of the rotorcraft. The control unit 10 has a calculation module 14 having main calculation means 15 dedicated to determining the required speed Nr from a flight circumstance and/or a flight situation as previously estimated. The variation in the value calculated for the required speed Nr is potentially continuous progressive variation of a value for variation of values in steps having predefined values.

Consideration is given to a difference between a current power Pc and an anticipated power Pf.

The current power Pc corresponds to the power needs of the rotorcraft at a given instant T1. The current power Pc is calculated in particular depending on the load applied to the rotor(s) at a current speed V for driving the main rotor 1 in rotation, and/or, where applicable, depending on the current modes of operation of mechanical energy consuming members on board the rotorcraft. At a given instant T1, the current power Pc is defined for a said given speed V depending on a current flight circumstance Cc.

The concept of "current" should be considered relative to an immediate flight state and/or flight situation of the rotorcraft. By way of example, the current speed V comes from a measurement and/or a calculation performed by implementation on board the aircraft. By way of example, the current speed V may also be determined depending on a previously generated required speed Nr.

The anticipated power Pf corresponds to the power needed by the rotorcraft in accordance with an anticipated flight circumstance Cf determining the required speed Nr at a variable instant T2 depending on the anticipated flight circumstance Cf by calculation. Specifically, the anticipated power Pf is calculated essentially for driving the rotor(s) 1, 2 at an instant T2, or else, where appropriate, by taking account of one or more of said mechanical energy consuming members on board the aircraft being put into operation.

The control unit 10 has additional calculation means 17 for calculating a power surplus S that the power plant 3 needs to deliver progressively between the instant T1 and the instant T2 in order to ensure that the main rotor 1 is driven at the required speed Nr. Such a power surplus S takes account in particular of the variation between the current speed V and the required speed Nr, regardless of whether that involves acceleration or on the contrary deceleration.

On the basis of the calculated anticipated power Pf and power surplus S, the control unit 10 determines by a summing operation the total power Pt that the power plant 3 must deliver in order to satisfy the needs of the rotorcraft. The control order C transmitted to the regulator unit 9 is determined by the control unit 10 on the basis of this total power Pt.

It can be seen that the control order C is determined by the control unit 10 taking account not only of the anticipated power Pf that the power plant 3 must deliver for driving rotation of the rotor(s) 1, 2 in accordance with the required speed Nr at which the main rotor 1 is to be driven in rotation, but also of the power surplus S that the power plant 3 must deliver progressively between the current power Pc at instant T1 and the anticipated power Pf at the instant T2.

Figure 2:
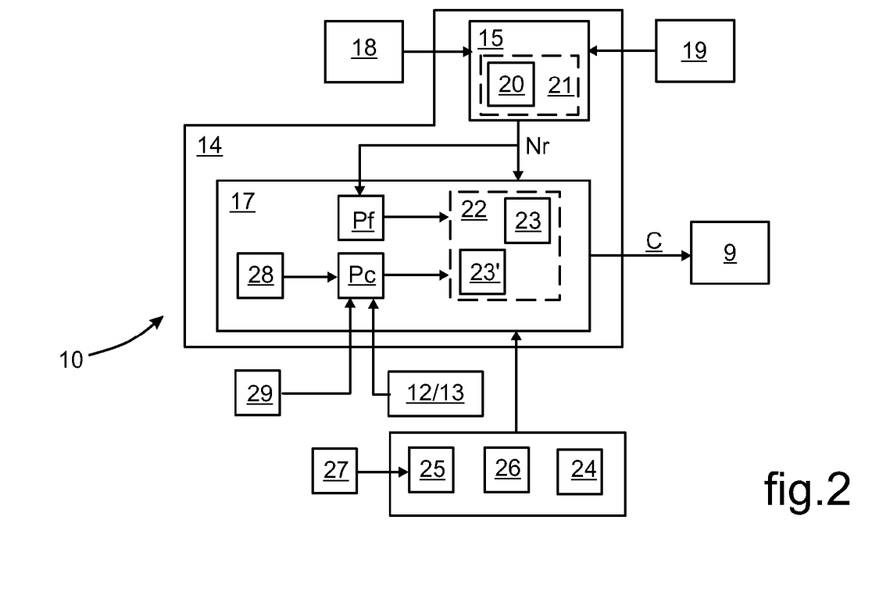
FIG. 2 is a block diagram showing particular modes of executing a method of determining a power setpoint in the context of implementing the method shown in FIG. 1.

More particularly, FIG. 2 shows a calculation module 14 included in the control unit 10 and serving to determine a said control order C for transmitting to a regulator unit 9 in accordance with the provisions mentioned above with reference to FIG. 1.

Main calculation means 15 are dedicated to identifying said required speed Nr, and for this purpose they are in communication with various information generator means 18, 19. By way of example, such information may comprise in isolation or in combination information about: variation, either in steps or else and preferably progressive continuous variation, concerning at least one physicochemical parameter 18 of the ambient air outside the rotorcraft, in particular the density of the air; and/or flight controls 19 operated by a pilot of the rotorcraft in order to vary the angle of incidence of the blades of the rotor(s) 1, 2, which pilot may equally be a human pilot or an autopilot.

The required speed Nr is identified by the main calculation means 15 by executing a first calculation rule 21 incorporating a first calculation parameter 20 that takes account of variation in the value of the information from the information generator means 18, 19.

Additional calculation means 17 may equally well be incorporated in or associated with the main calculation means 15, and they serve to prepare the control order C transmitted to the regulator unit 9. The first calculation rule 20 and the second calculation rule 21 may potentially be incorporated in a common calculation rule 20, 22, or else they may potentially be distinct calculation rules 20 and 22 that are executed in succession.

On the basis of the required speed Nr, a second calculation rule 22 incorporated in additional calculation means 17 is executed. The second calculation rule 22 incorporates a second calculation parameter 23, in particular relating to at least one required speed Nr, in order to deduce the anticipated power Pf on the basis at least of the value of the required speed Nr.

The second calculation rule also incorporates a third calculation parameter 23', on the basis of which said power surplus S is evaluated. The third calculation parameter 23' potentially takes account not only of a first calculation criterion relating to said variation between the current speed V and the required speed Nr, but also in isolation or in combination various secondary calculation criteria 24, 25, 26 defining a flight circumstance and/or a flight situation of the rotorcraft. For example, a second calculation criterion 25 relates to modes of using various members and/or pieces of equipment 27 of the rotorcraft that consume mechanical power. Also by way of example, a third calculation criterion relates to the flight state of the rotorcraft. Incorporating said secondary calculation criteria 24, 25, 26 in the calculation parameter 23' enables them to be taken into account not only for determining at least the anticipated power Pf, but also for determining said power surplus S, if any, that the power plant 3 must deliver.

The current power Pc may for example be identified by memory means 28 forming part of the additional calculation means 17, and/or by sensors 29 that evaluate the current power Pc depending on the current flight circumstance of the rotorcraft, or indeed it is identified by said control modules 12, 13.

What is claimed is:

1. A method of driving rotation of at least one rotorcraft rotor by a power plant of the rotorcraft, the method comprising the following operations:
a control unit identifying a required speed (Nr) for driving rotation of at least one vertical-axis main rotor of the rotorcraft, the required speed (Nr) being calculated by applying a first calculation rule incorporating at least a first calculation parameter giving rise to controlled variation, within a predefined range of values, in the value of the required speed (Nr) depending on variation in the value of the first calculation parameter;
the control unit applying a method of calculating a power setpoint to be delivered by the power plant, the calculation of the power setpoint being based at least on applying a second calculation rule incorporating at least one second calculation parameter for calculating anticipated power (Pf) that the power plant must deliver as a function at least of loads supported by the main rotor driven at the previously-identified required speed (Nr); and
transmitting at least one control order (C) relating at least to the power setpoint to regulator means for regulating the operation of the power plant, the regulator means causing the power plant to be operated to drive the at least one rotor in rotation in compliance with driving the main rotor in rotation at the required speed (Nr), the regulator means comprising at least one regulator unit for regulating injection of fuel to at least one fuel-burning engine of the power plant;
wherein the second calculation rule for calculating the power setpoint (Pt) incorporates at least one third calculation parameter concerning a power surplus (S), the power surplus (S) relating to progressive power needs to be delivered from a current power (Pc) for driving the main rotor at a current speed (V) of rotation to an anticipated power (Pf) for driving the main rotor at the required speed (Nr);
wherein the method comprises the following steps:
evaluating the current power (Pc) delivered by the power plant;
collecting the required speed (Nr) as generated by main calculation means incorporating the first calculation rule;
deducing the anticipated power (Pf) corresponding to the power needed for driving the main rotor at the required speed (Nr) by executing the second calculation rule in application of the second calculation parameter;
deducing the total power (Pt) to be delivered depending on the previously deduced anticipated power (Pf) and depending on the power surplus (S) calculated by executing the second calculation rule in application of the third calculation parameter; and
transmitting to the regulator unit a control order (C) relating at least to the previously-deduced total power (Pt) to be delivered;
wherein the step of evaluating the current power (Pc) delivered by the power plant comprises equally well in isolation or in combination:
an operation of collecting known information relating to the current power (Pc) as previously calculated by implementing the method; and
an operation of measuring in real time the number of revolutions performed by the main rotor at a given instant.

2. A method according to claim 1, wherein the third calculation parameter incorporates a first calculation criterion relating to the acceleration or conversely to the deceleration of the main rotor between the current speed (V) and the required speed (Nr).

3. A method according to claim 2, wherein the first calculation criterion is a calculation criterion relating to a progressive variation in the speed of rotation of the main rotor, the first calculation criterion comprising any of at least the following calculation criteria:
a time period (T1, T2) between driving the main rotor at the current speed (V) and at the required speed (Nr);
a progressive variation in the number of revolutions of the main rotor between the number of revolutions of the main rotor driven at the current speed (V) and the number of revolutions of the main rotor driven at the required speed (Nr);
the instantaneous time derivative of the anticipated power (Pf); and
any of at least first calculation parameters from which the required speed (Nr) is defined.

4. A method according to claim 1, wherein the third calculation parameter incorporates a second calculation parameter relating to modes of using auxiliary members on board the aircraft that consume mechanical power over a time period (T1, T2) between driving the main rotor at the current speed (V) and at the required speed (Nr).

5. A method according to claim 4, wherein the second calculation criterion is a calculation criterion comprising any of at least the following calculation criteria:
varying forces developed by an anti-torque device of the aircraft;
varying the cyclic pitch of the blades of the main rotor;
controlling the operation of at least one movable control of the rotorcraft suitable for modifying its flight behavior;
controlling the operation of at least one piece of ancillary equipment of the rotorcraft; and
controlling the operation of an electrical machine.

6. A method according to claim 1, wherein the third calculation parameter incorporates a third calculation criterion relating to a flight situation of the rotorcraft and comprising any of at least the following calculation criteria:
progressive variation in the distance along the gravity axis between the rotorcraft and a terrestrial frame of reference;
variation in the aerodynamic characteristics of the rotorcraft; and
progressive variation in any of at least physicochemical parameters of the ambient air outside the rotorcraft.

7. A method according to claim 1, wherein the method comprises the following steps:
evaluating the current power (Pc) delivered by the power plant;
collecting the required speed (Nr) as generated by main calculation means incorporating the first calculation rule;
deducing the anticipated power (Pf) corresponding to the power needed for driving the main rotor at the required speed (Nr) by executing the second calculation rule in application of the second calculation parameter;
calculating the power surplus (S) by executing the second calculation rule in application of the third calculation parameter; and
transmitting a first calculation order (C) relating at least to the anticipated power (Pf) to the regulator unit, and transmitting a second control order (C) relating at least to the power surplus (S) to control means for operating an electrical machine of the power plant, which machine is engaged in a drivetrain for driving the main rotor.

8. A method according to claim 1, wherein the step of deducting the anticipated power (Pf) comprises an operation of calculating the load to which the main rotor driven at the required speed (Nr) will be subjected, and an operation of calculating the anticipated power (Pf) on the basis of the calculated load.

9. A method according to claim 7, wherein the step of calculating the power surplus (S) comprises an operation of calculating the derivative of the difference between the revolutions of the main rotor driven respectively at the current speed (V) and at the required speed (Nr) over a given time period.

10. A method according to claim 1, wherein the second calculation rule may be executed equally well by sequences at a given frequency or continuously depending on continuous variation in the value of the third calculation parameter.

11. A method according to claim 1, wherein the required speed (Nr) is determined by the first calculation rule equally well by detecting a value threshold reached by at least one the first calculation parameter for the required speed (Nr), or by detecting a continuous progressive variation in the value of at least one the first calculation parameter.

12. A method according to claim 1, wherein the control unit generates a required speed (Nr) setpoint that is transmitted at least to servo-control means for servo-controlling the drive of the main rotor to the required speed (Nr).

13. A method of driving rotation of at least one rotorcraft rotor by a power plant of the rotorcraft, the method comprising the following operations:
a control unit identifying a required speed (Nr) for driving rotation of at least one vertical-axis main rotor of the rotorcraft, the required speed (Nr) being calculated by applying a first calculation rule incorporating at least a first calculation parameter giving rise to controlled variation, within a predefined range of values, in the value of the required speed (Nr) depending on variation in the value of the first calculation parameter;
the control unit applying a method of calculating a power setpoint to be delivered by the power plant, the calculation of the power setpoint being based at least on applying a second calculation rule incorporating at least one second calculation parameter for calculating anticipated power (Pf) that the power plant must deliver as a function at least of loads supported by the main rotor driven at the previously-identified required speed (Nr); and
transmitting at least one control order (C) relating at least to the power setpoint to a power plant regulator, the regulator causing the power plant to be operated to drive the at least one rotor in rotation in compliance with driving the main rotor in rotation at the required speed (Nr), the regulator comprising at least one regulator unit for regulating injection of fuel to at least one fuel-burning engine of the power plant;
wherein the second calculation rule for calculating the power setpoint (Pt) incorporates at least one third calculation parameter concerning a power surplus (S), the power surplus (S) relating to progressive power needs to be delivered from a current power (Pc) for driving the main rotor at a current speed (V) of rotation to an anticipated power (Pf) for driving the main rotor at the required speed (Nr);
wherein the method comprises the following steps:
evaluating the current power (Pc) delivered by the power plant;
collecting the required speed (Nr) as generated by main processor incorporating the first calculation rule;
deducing the anticipated power (Pf) corresponding to the power needed for driving the main rotor at the required speed (Nr) by executing the second calculation rule in application of the second calculation parameter;
deducing the total power (Pt) to be delivered depending on the previously deduced anticipated power (Pf) and depending on the power surplus (S) calculated by executing the second calculation rule in application of the third calculation parameter; and
transmitting to the regulator unit a control order (C) relating at least to the previously-deduced total power (Pt) to be delivered;
wherein the step of evaluating the current power (Pc) delivered by the power plant comprises equally well in isolation or in combination:
an operation of collecting known information relating to the current power (Pc) as previously calculated by implementing the method; and
an operation of measuring in real time the number of revolutions performed by the main rotor at a given instant.

14. A method according to claim 13, wherein the third calculation parameter incorporates a first calculation criterion relating to the acceleration or conversely to the deceleration of the main rotor between the current speed (V) and the required speed (Nr).

15. A method according to claim 14, wherein the first calculation criterion is a calculation criterion relating to a progressive variation in the speed of rotation of the main rotor, the first calculation criterion comprising any of at least the following calculation criteria:
a time period (T1, T2) between driving the main rotor at the current speed (V) and at the required speed (Nr);
a progressive variation in the number of revolutions of the main rotor between the number of revolutions of the main rotor driven at the current speed (V) and the number of revolutions of the main rotor driven at the required speed (Nr);
the instantaneous time derivative of the anticipated power (Pf); and
any of at least first calculation parameters from which the required speed (Nr) is defined.

16. A method according to claim 13, wherein the third calculation parameter incorporates a second calculation parameter relating to modes of using auxiliary members on board the aircraft that consume mechanical power over a time period (T1, T2) between driving the main rotor at the current speed (V) and at the required speed (Nr).

17. A method according to claim 16, wherein the second calculation criterion is a calculation criterion comprising any of at least the following calculation criteria:
varying forces developed by an anti-torque device of the aircraft;
varying the cyclic pitch of the blades of the main rotor;
controlling the operation of at least one movable control of the rotorcraft suitable for modifying its flight behavior;
controlling the operation of at least one piece of ancillary equipment of the rotorcraft; and
controlling the operation of an electrical machine.

18. A method according to claim 13, wherein the third calculation parameter incorporates a third calculation criterion relating to a flight situation of the rotorcraft and comprising any of at least the following calculation criteria:
progressive variation in the distance along the gravity axis between the rotorcraft and a terrestrial frame of reference;
variation in the aerodynamic characteristics of the rotorcraft; and progressive variation in any of at least physicochemical parameters of the ambient air outside the rotorcraft.

19. A method according to claim 13, wherein the method comprises the following steps:

evaluating the current power (Pc) delivered by the power plant;

collecting the required speed (Nr) as generated by the main processor incorporating the first calculation rule;

deducing the anticipated power (Pf) corresponding to the power needed for driving the main rotor at the required speed (Nr) by executing the second calculation rule in application of the second calculation parameter;

calculating the power surplus (S) by executing the second calculation rule in application of the third calculation parameter; and     transmitting a first calculation order (C) relating at least to the anticipated power (Pf) to the regulator unit, and transmitting a second control order (C) relating at least to the power surplus (S) to controller for operating an electrical machine of the power plant, which machine is engaged in a drivetrain for driving the main rotor.

20. A method according to claim 13, wherein the step of deducing the anticipated power (Pf) comprises an operation of calculating the load to which the main rotor driven at the required speed (Nr) will be subjected, and an operation of calculating the anticipated power (Pf) on the basis of the calculated load.

\* \* \* \* \*